United States Patent [19]
Ansel et al.

[11] Patent Number: 4,754,056
[45] Date of Patent: Jun. 28, 1988

[54] RADIATION-CURABLE COATINGS CONTAINING REACTIVE PIGMENT DISPERSANTS

[75] Inventors: Robert E. Ansel; Kevin P. Murray, both of Hoffman Estates, Ill.

[73] Assignee: DeSoto, Inc., Des Plaines, Ill.

[21] Appl. No.: 938,452

[22] Filed: Dec. 5, 1986

Related U.S. Application Data

[62] Division of Ser. No. 720,251, Apr. 5, 1985, Pat. No. 4,673,705.

[51] Int. Cl.$^4$ .................... C07C 69/54; C07C 102/06; C07C 103/14; C07C 103/24
[52] U.S. Cl. ..................................... 560/171; 522/97; 526/304; 526/305; 562/571
[58] Field of Search ............................ 525/330.5, 386; 526/304, 305, 307; 560/171; 562/571

[56] References Cited
U.S. PATENT DOCUMENTS 3,914,165 10/1975 Gaske ................................. 525/330.5
4,026,851 5/1977 Greene .............................. 525/330.5
4,303,563 12/1981 Emmons et al. ................. 525/330.5
4,528,350 7/1985 Goosens et al. .................... 526/305

Primary Examiner—Allan M. Lieberman
Attorney, Agent, or Firm—Dressler, Goldsmith, Shore, Sutker & Milnamow, Ltd.

[57] ABSTRACT

Liquid coating compositions adapted to be cured by exposure to ionizing radiation are disclosed in which a liquid vehicle of coating viscosity having an ethylenically unsaturated portion comprising one or more polyethylenically unsaturated materials adapted to cure on radiation exposure, pigment dispersed in the vehicle, and an acrylate-functional radiation-curable dispersant having free carboxyl group for wetting the pigment and assisting in the stable dispersion of the pigment in the vehicle. This dispersant is an acrylate-functional carboxylic acid amide carrying free carboxyl groups, especially an adduct of a polyacrylate and a stoichiometric deficiency of a primary amine to provide a secondary amine having acrylate functionality, the secondary amine functionality being reacted with a polycarboxylic acid anhydride to form amide groups therewith.

5 Claims, No Drawings

RADIATION-CURABLE COATINGS CONTAINING REACTIVE PIGMENT DISPERSANTS

This application is a division of application Ser. No. 720,251 filed Apr. 5, 1985, now U.S. Pat. No. 4,673,705.

DESCRIPTION

1. Technical Field

This invention relates to radiation-curable pigmented coating compositions in which the wetting of the pigment is facilitated by the presence of a dispersant which participates in the radiation cure. This invention includes the radiation-curable dispersants as well as pigmented coating compositions containing the same. Electron beam radiation is particularly contemplated.

2. Background Art

Radiation cure of ethylenically unsaturated coating compositions is well known. Ultraviolet radiation is particularly desirable for this purpose, but it does not penetrate opaque pigments very well. When the coating is to be extensively pigmented, as in coatings which are pigmented with magnetizable oxide particles to form magnetic recording structures, more penetrating ionizing radiation is desired. Electron beam radiation provides the preferred curing radiation.

To provide good film properties, the unsaturated materials present in the coating composition include polyethylenically unsaturated materials, which are preferably oligomers. These polyethylenic materials, and especially those which are oligomers, possess poor wetting characteristics, so the grinding of the pigment into the polyethylenically unsaturated vehicle becomes a significant problem. If the pigment is not properly wetted and dispersed in the vehicle, it will not be uniformly dispersed in the cured film.

Some progress has been made in providing polyethylenically unsaturated oligomers which possess improved wetting characteristics, but it is desired to maximize the pigment wetting capacity since this minimizes the difficulty of dispersing the pigment into the polyethylenically unsaturated vehicle. The grinding operation is time consuming and costly.

DISCLOSURE OF INVENTION

In accordance with this invention, a liquid coating composition adapted to be cured by exposure to ionizing radiation comprises a liquid vehicle of coating viscosity including an ethylenically unsaturated portion comprising one or more polyethylenically unsaturated materials adapted to cure on radiation exposure, and an acrylate-functional radiation-curable pigment dispersant. This vehicle is adapted to have pigment dispersed therein and may be sold as such, and the invention includes the pigmented vehicle, The acrylate-functional radiation-curable dispersant is a new compound which is an adduct of a polyacrylate and a stoichiometric deficiency of a primary amine, this adduct being a secondary amine having acrylate functionality. Most or all of the secondary amine functionality is consumed by reaction with a polycarboxylic acid anhydride which forms amide groups therewith. The dispersant is thus an acrylate-functional carboxylic acid amide which carries free carboxylic acid groups formed by opening the anhydride ring.

The polycarboxylic acid anhydride may be saturated, as in phthalic anhydride, or it may be unsaturated, as in maleic anhydride. The carboxyl group formed by the opening of the anhydride group, as well as any other carboxyl group present on the selected anhydride, helps to wet the pigment.

The acrylate functional groups in the dispersant are easily copolymerizable with the unsaturated materials in the liquid vehicle, and this helps to permanently incorporate the pigment dispersant of this invention into the radiation-cured coating.

As disclosed in the prior patent of one of us (see U.S. Pat. No. 4,496,686), unsaturated polycarboxylic acid anhydrides, and especially maleic anhydride, were used to provide an unsaturated pigment dispersant. However, the acrylate unsaturation employed in this invention provides a more rapid and complete radiation cure.

The dispersant, as previously indicated, is an adduct of a polyacrylate with a stoichiometric deficiency of a primary amine to provide a secondary amine with acrylate functionality. This secondary amine is reacted with a polycarboxylic acid anhydride to provide an acrylate-functional carboxylic acid amide having free carboxyl groups. In normal practice, the polyacrylate is reacted with about one molar proportion of primary amine so as to provide each polyacrylate molecule with at least one secondary amine group. However, if some of the starting polyacrylate remains unreacted, this is not important because the polyacrylate is itself an acceptable component of the coating composition.

The important factor with respect to the proportion of amine is that some of the acrylate groups must be left unreacted in order that these might participate in subsequent radiation cure. If some of the adducts which are formed contain no acrylate unsaturation, this is still permissible where the anhydride which is later used to introduce carboxyl functionality is itself unsaturated, as when maleic anhydride is used.

The polyacrylate is itself subject to wide variation so long as it contains a plurality of acrylate groups. Thus, ethylene glycol diacrylate, butylene glycol diacrylate, 1,6-hexane glycol diacrylate, the diacrylate of the adduct of two moles of ethylene or propylene oxide with one mole of neopentyl glycol or bisphenol A, glycerin diacrylate, trimethylol propane diacrylate and triacrylate, pentaerythritol triacrylate and tetraacrylate, and $C_2$–$C_4$ alkylene oxide adducts of these polyhydric alcohols to provide higher molecular weight polyhydric alcohols having a molecular weight up to about 6,000 which are esterified with acrylic acid, are all useful herein.

Any primary amine having a molecular weight of from about 50 to about 8,000 and containing one or more primary amine groups may be used. These are illustrated by butyl amine, octyl amine, and polyoxyalkylene amines containing from 2–4 carbon atoms in the alkylene group, such as polyoxypropylene amine having a molecular weight of about 600. Diprimary amines are also useful, such as fatty acid dimer diamine and polyoxypropylene diamine having a molecular weight of about 400.

It will be understood that secondary amino hydrogen atoms will adduct with acrylate unsaturation, but far more slowly than primary amino hydrogen atoms. As a result, when moderate temperatures are employed, such as from 50° C. to 70° C., the acrylate unsaturation does not consume many secondary amino hydrogen atoms, and these remain largely unreacted for several hours until the anhydride is added.

The polycarboxylic acid anhydride may be saturated, as in phthalic anhydride or succinic anhydride. The anhydride may include additional carboxylic acid groups, as in trimellitic anhydride. Unsaturated anhydrides are preferred in some instances, such as maleic anhydride. Even dianhydrides, for example pyromellitic acid dianhydride, can be used when it is desired to link two of the secondary amine compounds together.

As will be understood, the carboxyl group formed by the opening of the anhydride group, as well as any other carboxyl group which may be present on the selected anhydride, will be present on every molecule of secondary amine which reacts. It is preferred to consume all of the secondary amine functionality since it is reactive with acrylate unsaturation. Thus, if the secondary amine groups are not consumed under conditions which enable adduction with available anhydride groups, the unreacted amine will tend to tie up acrylate unsaturation which should be retained for cure. This is not desirable, though some limited consumption of acrylate unsaturation can be tolerated.

As a result, it is preferred to employ a stoichiometric proportion of the anhydride based on amine functionality in the amine-polyacrylate adduct.

Unreacted anhydride functionality is not desired. When the polyacrylate includes hydroxy functionality, any excess anhydride can react with that unsaturation to form a carboxy ester, and some carboxy ester formation can be tolerated.

In some instances it is desired to increase the molecular weight of the dispersants of this invention without consuming the carboxyl functionality which aids wetting. When an hydroxy-functional polyacrylate is used, for example pentaerythritol triacrylate, then the hydroxy group remains unreacted when that triacrylate is reacted with one molar proportion of a monoprimary amine. After the secondary amine functionality has been consumed by reaction with one molar proportion of monoanhydride, the carboxy-functional amide so formed still includes one hydroxy group. If a diisocyanate is then added, it can be reacted with this hydroxy group to link two of the carboxy-functional amide molecules together in a low molecular weight polyurethene.

The reaction between the dicarboxylic acid anhydride and the secondary amino hydrogen atom is a simple adduction reaction which is itself well known and which proceed smoothly to completion by opening the anhydride ring. The amide which is formed carries a carboxyl group and it is thought that the combination of amide functionality and carboxyl functionality provides superior pigment wetting characteristics.

Referring more particularly to the liquid vehicle of coating viscosity, the film-forming component is ethylenically unsaturated and it includes one or more polyethylenically unsaturated materials adapted to cure on radiation exposure to provide good film properties. These unsaturated materials are all conventional.

It is preferred that the polyethylenically unsaturated materials be oligomeric to possess some significant molecular weight, but simple polyacrylates and polymethacrylates of polyhydric alcohols are acceptable. These are illustrated by ethylene glycol diacrylate, butylene glycol diacrylate, 1,6-hexane glycol diacrylate, the diacrylate of the adduct of two moles of ethylene or propylene oxide with one mole of neopentyl glycol, glycerin diacrylate, trimethylol propane diacrylate and triacrylate, pentaerythritol triacylate and tetraacrylate, and C$_2$–C$_4$ alkylene oxide adducts of these polyhydric alcohols which form higher molecular weight polyhydric alcohols having a molecular weight up to about 6,000 which are esterified with acrylic acid. The corresponding methacrylates formed by replacing acrylic acid with methacrylic acid are also useful.

The preferred polyethylenically unsaturated materials are low to moderate molecular weight oligomers having a small number of groups which are reacted, as with hydroxyethyl acrylate, to introduce terminal ethylenic groups. Oligomers having a molecular weight of from about 500 to about 40,000 and providing 1–30 unreacted hydroxy or carboxy groups per molecule are preferred, especially those with polyether groups held together by 4–100 urethane groups per molecule. Some of these urethane groups may be replaced by urea groups.

It is presently preferred to use polyethylenically unsaturated materials which are polyurethanes which contain hydroxy or carboxy functionality because diisocyanates are linked together with an at least trifunctional linking agent containing hydroxy or carboxy groups which remain unreacted. The linking agent may be a polyol, such as glycerin or trimethylol propane, or an amino alcohol containing at least one hydroxyl group and sufficient additional hydroxy and/or amino hydrogen atoms to react with all of the isocyanate functionality present, such as monoethanol amine, or a carboxyl-functional diol, such as dimethylol propionic acid. These are described in R. E. Ansel applications Ser. No. 571,190 filed Jan. 16, 1984, and Ser. No. 700,545 filed Feb. 11, 1985 both now abandoned. Products of this character are employed in the examples. By using a polyethylenically unsaturated oligomer containing hydroxy or carboxy groups, a polyethylenically unsaturated oligomer having reasonable wetting characteristics is combined with the polymerizable dispersants of this invention which further improve the pigment wetting.

The above oligomers are preferably hydroxy- or carboxy-functional diethylenically unsaturated polyurethanes produced by reacting a linear diisocyanate-terminated polycarbonate diol polyurethane oligomer having the formula:

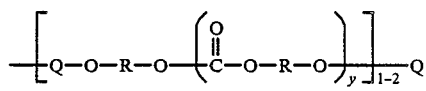

in which R is the residue of an alkylene diol containing 2–12 carbon atoms, such as 1,4-butane diol or 1,6-hexane diol; Q is the residue of a diisocyanate, like isophorone diisocyanate; y is at least 1, and R and y provide a molecular weight of 300–3000. These are produced as shown later and reacted with a deficiency of a monohydric ethylenically unsaturated compound, especially a monohydric acrylate, such as 2-hydroxypropyl acrylate, 2-hydroxyethyl acrylate, or pentaerythritol triacrylate, to provide an oligomeric monoisocyanate having one or more ethylenic groups on one of its two ends. This oligomeric unsaturated monoisocyanate, preferably in admixture with unreacted diisocyanate, is then reacted with enough at least trifunctional linking agent, as previously illustrated, to leave at least about one equivalent of hydroxy or carboxy functionality per mole of linking agent used.

Other useful oligomers are polyurethanes formed by reacting 5 moles of polypropylene glycol of molecular weight 600 with 6 moles of isophorone diisocyanate and 2 moles of monohydric acrylate, such as 2-hydroxyethyl acrylate.

Using a polysiloxane polycarbinol to further illustrate useful oligomers, these are available with a molecular weight of from 500 to 20,000, a molecular weight of 6,000 being typical, and can be reacted with acrylic acid to form a polyacrylate which possesses acrylic unsaturation. One can use an hydroxyalkyl acrylate or methacrylate in which the alkyl group contains from 2–4 carbon atoms, for example 2-hydroxyethyl acrylate or methacrylate, and couple the unsaturated group to the carbinol group as an ether. One can also react the 2-hydroxyethyl acrylate or methacrylate with a molar proportion of a diisocyanate, such as isophorone diisocyanate, to provide an unsaturated monoisocyanate which can be coupled to the carbinol group by urethane formation.

The terms "polyacrylate" and "polymethacrylate" are used herein to denote a plurality of acrylic acid or methacrylic acid ester groups, and this is one accepted use of these terms.

One can also use polyepoxide polyesters with acrylic or methacrylic acid. Suitable polyepoxides are illustrated by diglycidyl ethers of bisphenols, such as bisphenol A, having a molecular weight of from about 350 to about 7,000. A diglycidyl ether of bisphenol A having a molecular weight of about 1,000 which has been reacted with two molar proportions of acrylic acid, provides a preferred illustration.

All sorts of other oligomers having from 2-10 reactive groups per molecule can be used, such as polyesters. Thus, hydroxy-functional polyesters made by polyesterifying a dicarboxylic acid, such as phthalic or adipic acids, with a small excess of diol, such as ethylene glycol or 1,4-butane diol, will provide a low molecular weight polymer which can be converted to a polyacrylate in the same fashion as explained with reference to the polysiloxane polycarbinols. A proportion of trifunctional material, such as trimethylol propane or trimellitic acid or anhydride, may be included in the polyester to increase its functionality.

As will be evident, a polyethylenically unsaturated material which will polymerize on radiation exposure is normally present in an amount of at least about 10%, preferably at least about 45%, based on the total weight of polymerizable material, to provide good film properties. But except for the preferred oligomers discussed previously, its selection is conventional and is not a feature of this invention. The lower the molecular weight of the polyethylene material, the greater its liquidity, and the smaller the proportions of other reactive and nonreactive liquids which are needed to lower the viscosity and enable the liquid mixture to be applied as a coating.

It is also desirable to reduce the viscosity of the coating composition by having present at least 10% of monoethylenically unsaturated liquid based on the total weight of polymerizable material. These monoethylenic liquids are selected based on their reactivity, their glass transition temperature, and their other characteristics. Suitable liquid monomers which can be used are methyl acrylate, 2-hydroxyethyl acrylate, phenoxyethyl acrylate, methyl methacrylate, 2-ethylhexyl acrylate, ethoxy ethoxyethyl acrylate, isobornyl acrylate, and the corresponding methacrylates.

It is also possible to obtain desired liquidity by the inclusion of polyacrylates, such as pentaerythritol triacrylate or trimethylol propane di- or triacrylate.

It will be understood that the acrylates are more rapidly reactive and are preferred for that reason. On the other hand, the methacrylates form good films when appropriately exposed, and other monoethylenically unsaturated acid esters, for example crotonic acid esters, are also useful, though less readily available.

The desired liquidity of the coating composition can also be obtained using inert volatile organic solvents, like acetone, butyl acetate or isopropanol. These solvents can be used alone or in admixture with one another, and are frequently present in pigmented systems containing a pigment to binder weight ratio in excess of 1:1 in an amount to reduce the total solids content of the pigmented coating to the range of from 25% to 60%.

The coating compositions of this invention are pigmented, preferably in a pigment to binder weight ratio of at least about 0.5:1. Many of these pigments will absorb ultraviolet light so that ionizing radiation is needed to penetrate the pigmented coating and cure the same. Electron beam radiation is preferred.

Magnetic oxide particles are particularly desired since these allow the provision of magnetic recording structures, especially when used in a pigment to binder weight ratio of at least 2:1. Regardless of the purpose of the pigmented coating, the pigment must be uniformly ground into and wetted by the vehicle if a cured coating containing uniformly dispersed pigment is to be formed. This is facilitated by the presence of the acrylate-functional radiation-curable dispersants which are used herein.

A typical composition in this invention intended to be cured by electron beam exposure, contains a pigment to binder weight ratio of 3:1 and the dispersant is present in a proportion of 2%, based on the weight of the pigment. This composition would also include inert volatile organic solvent to provide coating viscosity. The solvent reduces the total solids content of the pigmented coating to the range of 25% to 60%.

As will be understood, a prime purpose of pigmenting a coating composition is to provide an opaque coating with an attractive appearance, so titanium dioxide rutile is a preferred pigment. Additional colorants may be added to provide desired coloration, as is common knowledge in making paint.

Referring more particularly to the acrylate-functional radiation-curable dispersants which are used herein, these are normally added to the liquid vehicle prior to pigmentation, but the proportion of the dispersant present may be measured either prior to or subsequent to incorporation of the pigment. The usual pigmented systems in this invention contain inert volatile organic solvent to provide the solids content previously noted. The pigment-free vehicle will contain from 1% to 20% of the dispersant, preferably from 3% to 16%. In the pigmented coating, the dispersant concentration is usually from 0.25% to 7%, preferably from 1% to 5%.

This invention is illustrated in the examples which follow, it being understood that throughout this application, all parts and proportions are by weight, unless otherwise specified. All molecular weight are by calculation from the functionality of the material, unless otherwise specified.

EXAMPLE 1

There are charged to a 250 ml three neck round bottom flask equipped with a thermometer, distilling column, heating mantle, magnetic stirrer, distilling head, air condenser, receiver and vacuum attachments, 45 grams of 1,4-butanediol, 85.6 grams of diphenyl carbonate and 0.1 gram of sodium hydroxide. The flask is evacuated to a pressure of about 10 mm Hg and the mixture is stirred and heated to about 100° C. and kept at these conditions for about three hours during which slow phenol distillation is observed. After three hours the pressure is reduced to 1 mm Hg and the temperature raised to 120° C. for 1 hour to complete the phenol distillation. After 1 hour the residue is cooled to room temperature and acetic acid is added dropwise until the mixture is neutralized. A distillate of 75.5 grams of phenol and a residue of 53.2 grams of a polymeric carbonate diol having a number average molecular weight of 554 is recovered.

The polycarbonate produced above is a linear polymer having one hydroxyl group at each end thereof, so it is a polycarbonate diol.

EXAMPLE 2

4 moles of the polycarbonate diol of Example 1 is reacted with 8 moles of bis(4-isocyanatocyclohexyl) methane (Desmodur W may be used). The reaction is carried out at 50% solids content in tetrahydrofuran solvent in the presence of 0.1% of dibutyl tin dilaurate catalyst at 50° C. for 2 hours. Then, 2 moles of 2-hydroxyethyl acrylate are added to the solution and the mixture is held at 50° C. for 1 hour. Then, 3 moles of glycerine are added and the reaction is continued for another hour at 50° C. The result is a solution containing a diacrylate polyurethane oligomer in which the isocyanate functionality is consumed and the secondary hydroxyl group in the glycerin is retained.

EXAMPLE 3

30 grams of pentaerythritol triacrylate and 60 grams of a polyoxypropylene monoprimary amine having an approximate molecular weight of 600 are blended and heated between 50° C. and 70° C. for 1.5 hours forming the Michael addition reaction product. 0.05% phenothiazine is present as a liquid phase free radical inhibitor. Then, 10 grams of maleic anhydride is added and the temperature held between 60° C. and 80° C. for an additional 30 minutes. The resulting product is a diacrylate with one amide linkage and a single carboxyl group.

EXAMPLE 4

75.2 parts of the diacrylate polyurethane oligomer of Example 2 is combined with 6 parts of the carboxylic half amide of Example 3, and 18.8 parts of pentaerythritol triacrylate. The resulting mixture can be pigmented with magnetizable iron oxide pigment to a pigment to binder ratio of 3:1. As the grind proceeds, more tetrahydrofuran is added to a final solids content of 52%. The pigment grinds easily into the vehicle to produce a coating composition of coating viscosity, and the electron beam-cured films were uniformly pigmented. In comparison with the same system without the dispersant, the grind is about 25% faster, and the cured films have higher gloss and are smoother-surfaced. The dispersant is not observable on the surface of the film.

EXAMPLE 5

41.7 grams of a monohydric dicaprolactone monoacrylate having a molecular weight of 344 are blended with 16.0 grams of bis(4-isocyanatocyclohexyl)methane and 0.06 gram of dibutyl tin dilaurate and reacted until no residual NCO content is detected. 0.05% phenothiazine is present during the reaction. The resulting diurethane diacrylate is then reacted with 36.4 grams of the same monoprimary amine used in Example 1 forming the Michael addition product in the same way as in Example 1. Then, 5.4 grams of maleic anhydride are added forming the half amide-half acid monoacrylate by holding at a temperature between 60° C. and 70° C. for 1.5 hours to assure lowest amine content in the finished product.

EXAMPLE 6

Example 4 is repeated using the carboxylic acid amide of Example 5. Corresponding results are obtained.

EXAMPLE 7

29.9 grams of pentaerythritol triacrylate and 30.0 grams of the same type of monoprimary amine used in Example 3, this time having a molecular weight of about 300, are heated together at a temperature of 60° C.–70° C. for 1.5 hours. The resulting diacrylated secondary amine is then cooked with 10 grams of succinic anhydride forming the half amide-half acid reaction product. 0.05% phenothiazine is present.

EXAMPLE 8

Example 4 is repeated using the carboxylic acid amide of Example 7. Corresponding results are obtained.

EXAMPLE 9

In a pint can, 45 grams of Co-Fe$_2$O$_3$ are blended with 2.25 grams of the reaction product from Example 3. 52.75 grams of cyclohexanone are added along with 45 ml. of stainless steel shot. The mixture is shaken on a Red Devil Paint Conditioner for 3 hours whereafter the shot is removed and the gloss, optical rating, coercivity and squareness ratio are examined. Then, 9 grams of a urethane acrylate are added, the paint is shaken for an additional 30 minutes, and properties re-examined.

TABLE I

| Properties of the Dispersion and Coating of Example 9 | | |
|---|---|---|
| | 3 hours | 3.5 hours |
| Gloss 60°/85° | 101/97 | 93/99 |
| Optical Rating[1] | 1.5 | 1.5 |
| Coercivity (Oe) | 718 Oe | 722 Oe |
| Oriented squareness ratio[2] | .86 | .87 |

[1]An arbitrary method of examining coating particularity under 90× magnification. Ratings range from 1-best to 5-worst, with 1 and 2 being considered acceptable.
[2]Higher oriented squareness ratio indicates a better dispersion. For the systems under consideration, a ratio over .85 indicates excellent dispersion based on experience. Squareness is determined by orienting the wet coating (here by passing it over a 2000 Gauss permanent magnet) and then immediately drying the coating and exposing the dried coating to radiation to cure the same. The cured coating is tested in a 3000 Oersted magnetic field, and the coercivity and squareness are obtained in the conventional way.

EXAMPLE 10

In a clean pint can, 45 grams of chrome oxide are blended in 2.25 grams of the reaction product of Example 2. 52.75 grams of cyclohexanone are added along with 45 ml. of stainless shot. The mixture is shaken for 3 hours and the properties of the ground paint examined as in Example 9. Finally, 9 grams of a vinyl chloride-vinyl acetate copolymer containing about 13% vinyl acetate and partially hydrolyzed to vinyl alcohol (the Union Carbide Corporation product VAGH may be used) in a 30% solution of cyclohexanone are added, shaken for an additional 30 minutes and the properties re-examined.

TABLE II

Properties of the Dispersion and Coating of Example 10

| | 3 hours | 3.5 hours |
|---|---|---|
| Gloss 60°/85° | 105/105 | 84/106 |
| Optical Rating[1] | 1.5 | 1.5 |
| Coercivity (Oe) | 720 Oe | 723 Oe |
| Oriented squareness ratio[2] | .86 | .86 |

The footnotes to Table I apply here as well.

What is claimed is:

1. A carboxyl-functional amide having acrylate functionality which is an adduct of a polyacrylate and a stoichiometric deficiency of a primary amine having a molecular weight of about 50 to about 8,000 to provide a secondary amine having acrylate functionality, the formation of said secondary amine being carried out at a temperature which leaves the secondary amino hydrogen atoms largely unreacted, said secondary amino hydrogen atoms being reacted with a polycarboxylic acid anhydride to form amide groups therewith, thereby providing carboxyl groups.

2. A carboxyl-functional amide as recited in claim 1 in which about one molar proportion of primary amine is adducted with said polyacrylate to form one molar proportion of secondary amine which is reacted with one molar proportion of polycarboxylic acid anhydride.

3. A carboxyl-functional amide as recited in claim 2 in which said amine is a polyoxypropylene monoprimary amine, and said anhydride is maleic anhydride.

4. A carboxyl-functional amide as recited in claim 3 in which said polyacrylate is pentaerythritol triacrylate.

5. A carboxyl-functional amide as recited in claim 1 in which said adduct is formed at a temperature in the range of 50° C. to 70° C.

* * * * *